(12) United States Patent
Pust et al.

(10) Patent No.: US 7,983,002 B2
(45) Date of Patent: Jul. 19, 2011

(54) WIRE-ASSISTED MAGNETIC WRITE DEVICE WITH A GAPPED TRAILING SHIELD

(75) Inventors: Ladislav R. Pust, Savage, MN (US); Eric S. Linville, Shakopee, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 1057 days.

(21) Appl. No.: 11/823,026

(22) Filed: Jun. 26, 2007

(65) Prior Publication Data

US 2009/0002895 A1    Jan. 1, 2009

(51) Int. Cl.
*G11B 5/127* (2006.01)
(52) U.S. Cl. .................................. 360/125.04
(58) Field of Classification Search .................. 360/317, 360/319, 125.02, 125.04, 125.12, 125.17, 360/125.26
See application file for complete search history.

(56) References Cited

U.S. PATENT DOCUMENTS

| | | | |
|---|---|---|---|
| 4,268,584 A | 5/1981 | Ahn et al. | |
| 4,319,264 A | 3/1982 | Gangulee et al. | |
| 4,417,387 A | 11/1983 | Heslop | |
| 4,748,525 A * | 5/1988 | Perlov | 360/110 |
| 4,970,574 A | 11/1990 | Tsunenari | |
| 5,397,921 A | 3/1995 | Karnezos | |
| 5,812,344 A | 9/1998 | Balakrishnan | |
| 6,030,877 A | 2/2000 | Lee et al. | |
| 6,063,703 A | 5/2000 | Shinriki et al. | |
| 6,646,827 B1 | 11/2003 | Khizroev et al. | |
| 6,665,136 B2 | 12/2003 | Clinton et al. | |
| 6,683,002 B1 | 1/2004 | Chooi et al. | |
| 6,798,615 B1 | 9/2004 | Litvinov et al. | |
| 6,812,141 B1 | 11/2004 | Gaidis et al. | |
| 6,879,456 B2 | 4/2005 | Leighton et al. | |
| 6,917,484 B2 | 7/2005 | Ranmuthu | |
| 6,917,493 B2 | 7/2005 | Clinton et al. | |
| 6,954,331 B2 | 10/2005 | Crawford et al. | |
| 6,965,494 B2 | 11/2005 | Campbell et al. | |
| 6,972,916 B1 | 12/2005 | Aram et al. | |
| 7,035,027 B2 | 4/2006 | Barnett et al. | |
| 7,054,105 B2 * | 5/2006 | Mochizuki et al. | 360/125.03 |
| 7,070,716 B2 * | 7/2006 | Lam | 360/125.04 |
| 7,072,142 B2 * | 7/2006 | Lam | 360/123.19 |
| 7,106,554 B2 * | 9/2006 | Guan et al. | 360/125.16 |
| 7,185,415 B2 * | 3/2007 | Khera et al. | 29/603.12 |
| 7,397,633 B2 * | 7/2008 | Xue et al. | 360/125.3 |
| 2002/0092673 A1 | 7/2002 | Andricacos et al. | |
| 2003/0156359 A1 | 8/2003 | Takahashi et al. | |
| 2003/0210494 A1 * | 11/2003 | Campbell et al. | 360/125 |
| 2004/0108136 A1 | 6/2004 | Andricacos et al. | |

(Continued)

OTHER PUBLICATIONS

U.S. Patent and Trademark Office, Office Action Feb. 8, 2011, 18 pages.

*Primary Examiner* — Angel A. Castro
(74) *Attorney, Agent, or Firm* — Kinney & Lange, P.A.

(57) ABSTRACT

A magnetic device includes a write element having a write element tip and a first return element magnetically coupled to the write element on a trailing side of the write element. A conductor is positioned proximate to an edge of the write element tip and is configured to generate an assist field that augments a write field generated by the write element. A shield that includes at least one gap extends from the first return element toward the write element tip.

20 Claims, 8 Drawing Sheets

U.S. PATENT DOCUMENTS

| | | |
|---|---|---|
| 2004/0169950 A1 | 9/2004 | Clinton et al. |
| 2004/0196581 A1 | 10/2004 | VanEaton et al. |
| 2005/0006777 A1 | 1/2005 | Andricacos et al. |
| 2005/0054191 A1 | 3/2005 | Yu et al. |
| 2005/0070097 A1 | 3/2005 | Barmak et al. |
| 2005/0111137 A1* | 5/2005 | Ju et al. .................. 360/126 |
| 2005/0128637 A1 | 6/2005 | Johnston et al. |
| 2005/0174668 A1 | 8/2005 | Fang et al. |
| 2005/0213246 A1 | 9/2005 | Kief et al. |
| 2005/0280935 A1 | 12/2005 | Clinton et al. |
| 2006/0198047 A1 | 9/2006 | Xue et al. |
| 2007/0297081 A1* | 12/2007 | Nazarov et al. ............ 360/59 |
| 2008/0112087 A1* | 5/2008 | Clinton et al. ............ 360/317 |
| 2008/0117545 A1* | 5/2008 | Batra et al. ............ 360/125.01 |
| 2008/0316631 A1* | 12/2008 | Gao et al. ............ 360/55 |

\* cited by examiner

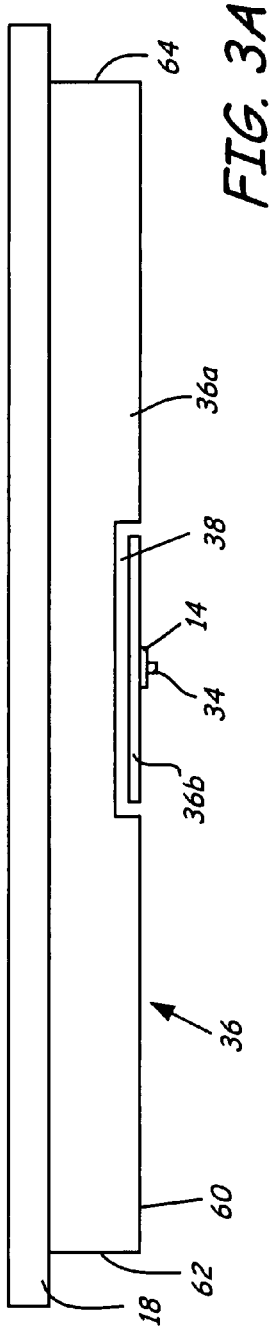
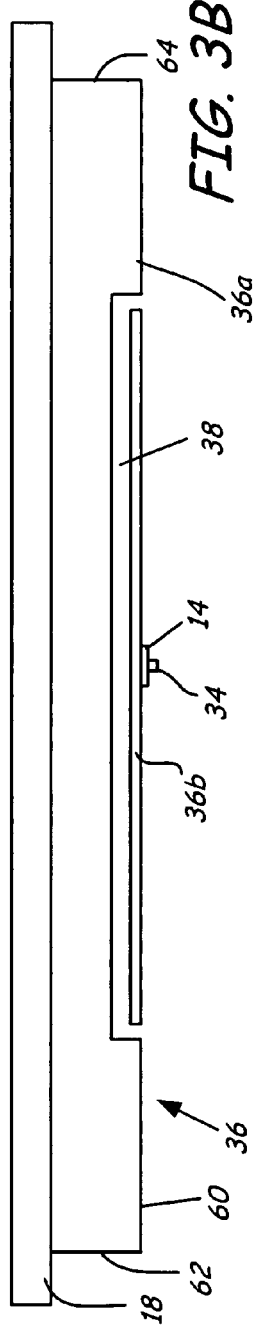
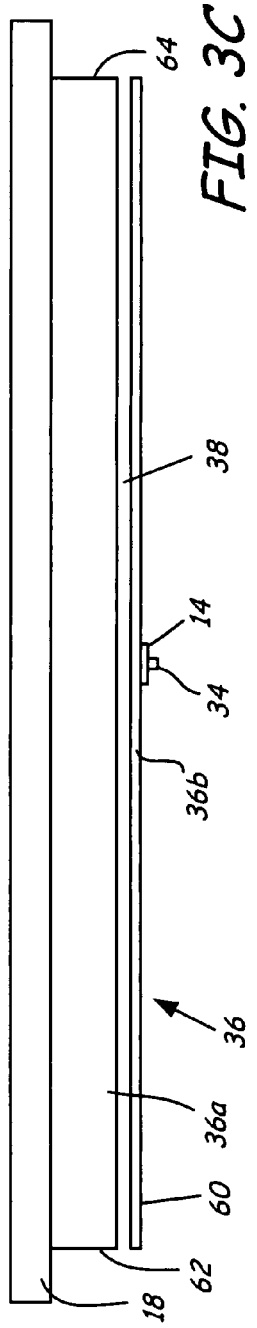

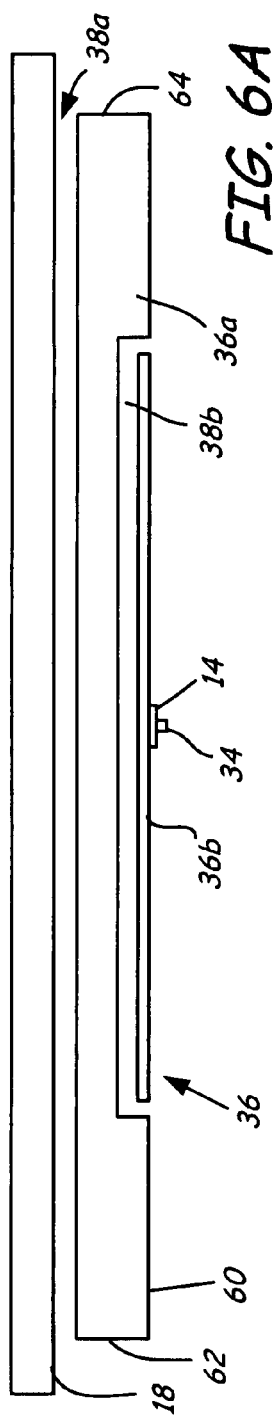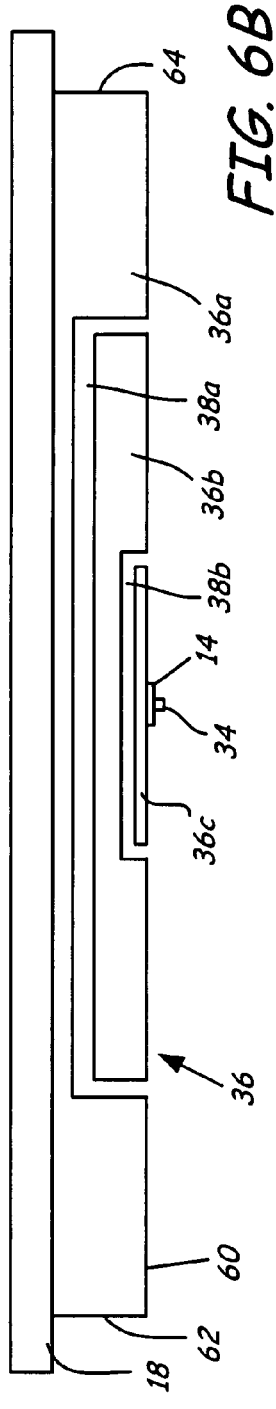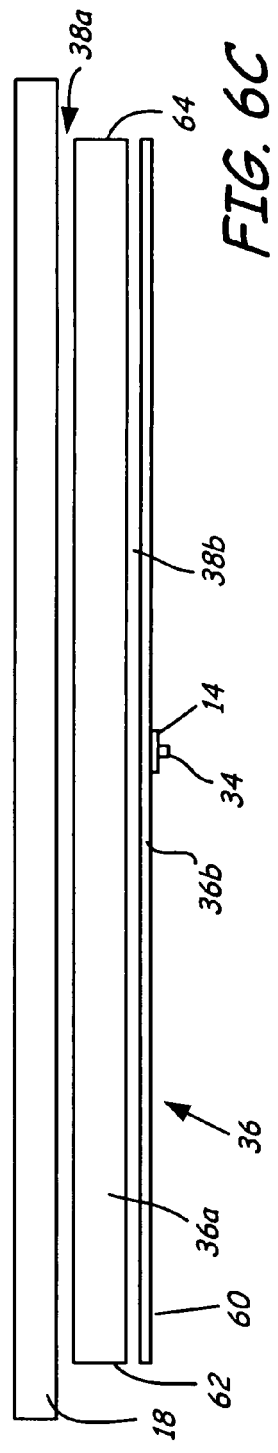

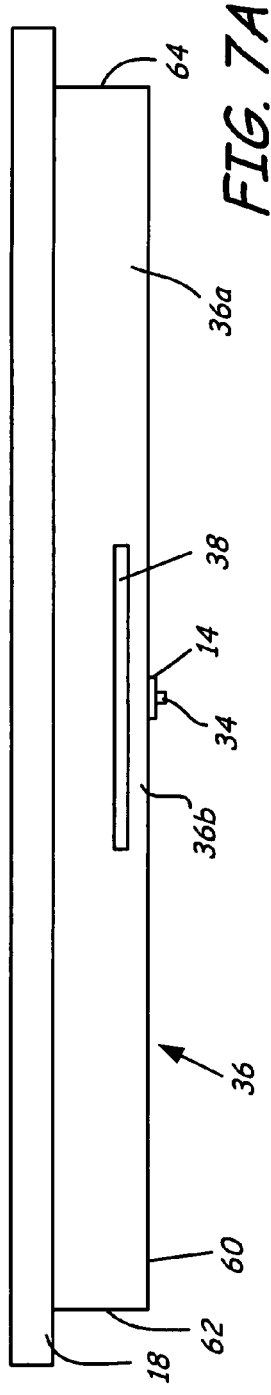
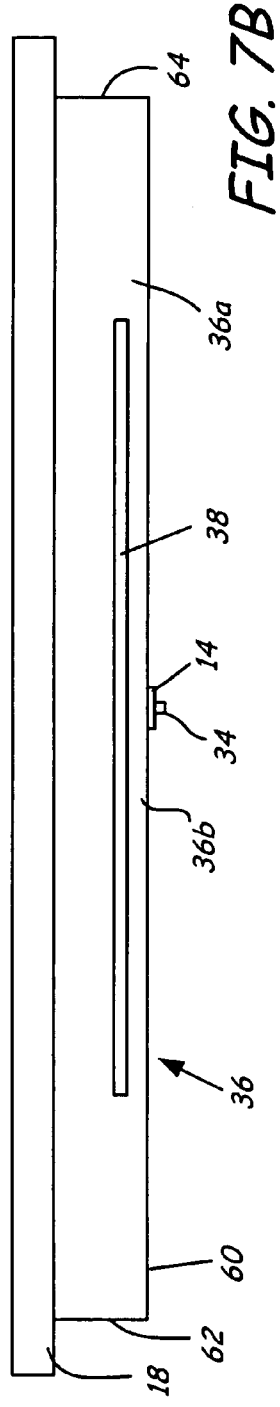
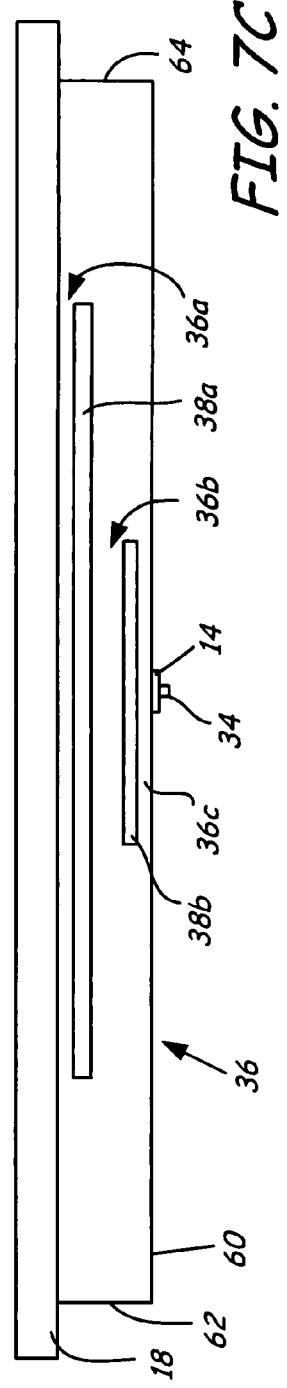

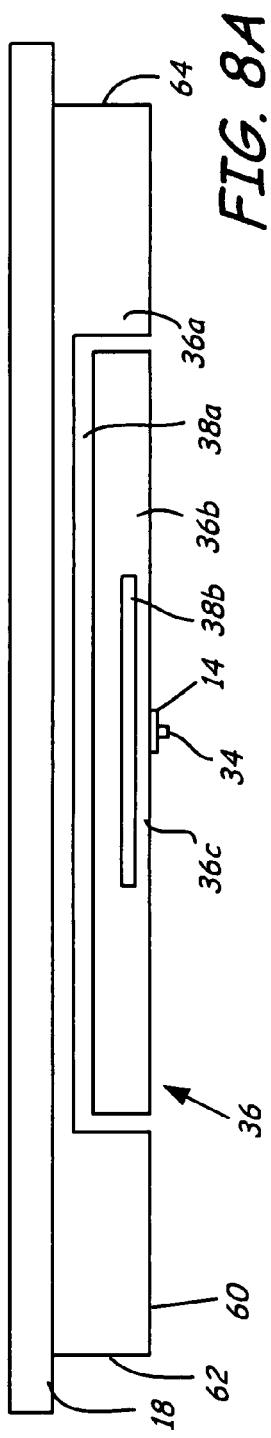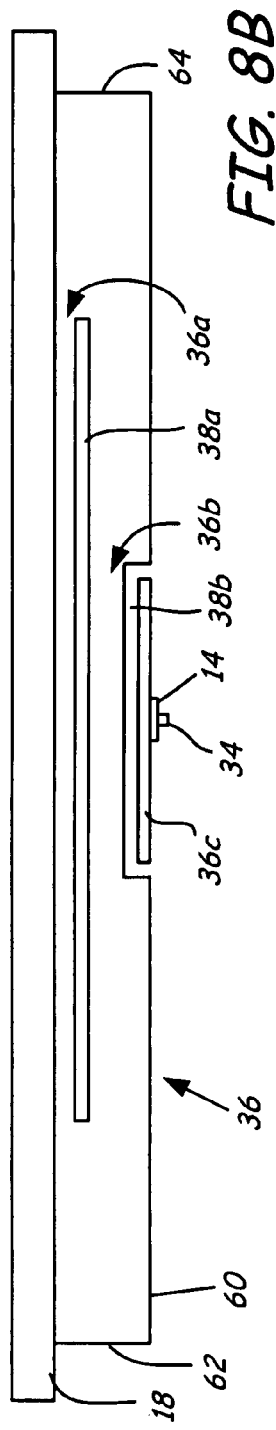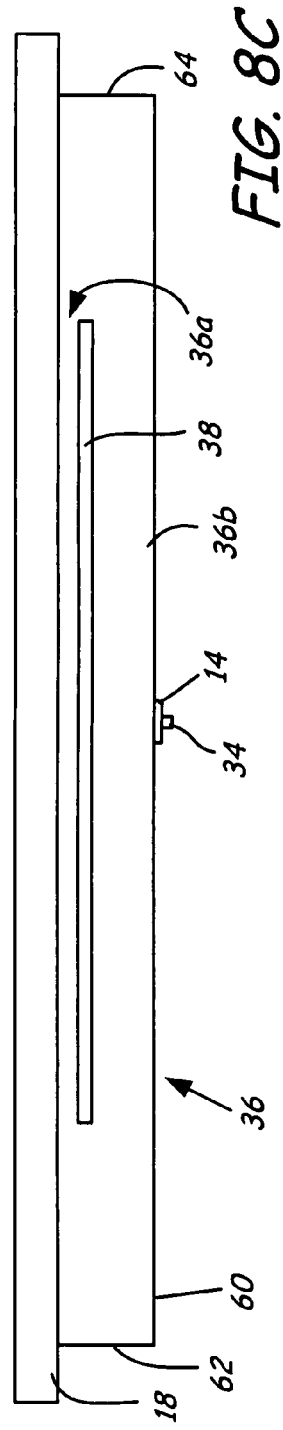

WIRE-ASSISTED MAGNETIC WRITE DEVICE WITH A GAPPED TRAILING SHIELD

BACKGROUND

The present invention relates to magnetic devices. More particularly, the present invention relates to a magnetic device that employs a current-carrying conductor to provide a magnetic field that assists a write field.

As magnetic recording storage densities continue to progress in an effort to increase the storage capacity of magnetic storage devices, magnetic transition (i.e., bit) dimensions and critical features of the recording device are being pushed below 100 nm. In addition, making the recording medium stable at higher areal densities requires magnetically harder (i.e., high coercivity) storage medium materials. A magnetically harder medium may be written to by increasing the saturation magnetization of the magnetic material of the recording device to increase the magnetic field applied to the magnetic medium. However, the maximum known material saturation magnetization is not sufficient to sustain the annual growth rate of bit areal densities.

Another approach to overcoming the coercivity of a magnetically hard medium is to provide a stronger write field by incorporating a write assist device adjacent to the tip of the write pole that produces an assisting magnetic field to overcome the coercivity of the magnetic medium near the write pole. The field gradient around the write pole tip is improved due to cancellation of stray fields from the write pole in regions that the assisting field opposes the write field. However, the regions in which the assist field opposes the write field are generally a distance from the write pole tip, and thus the gradient improvement is limited in the region in which transitions are written to the magnetic medium.

SUMMARY

The present invention relates to a magnetic device including a write element having a write element tip and a first return element magnetically coupled to the write element on a trailing side of the write element. A conductor, which is positioned proximate to an edge of the write element tip, is configured to generate an assist field that augments a write field generated by the write element. A shield that includes at least one gap extends from the first return element toward the write element tip.

BRIEF DESCRIPTION OF THE DRAWINGS

FIGS. 3A-3C are medium confronting surface views of a portion of the magnetic writer showing exemplary configurations for the gap in the trailing shield.

FIGS. 6A-6C are medium confronting surface views of a portion of the magnetic writer showing exemplary gap configurations for the trailing shield including two gaps.

FIGS. 7A-7C are medium confronting surface views of a portion of the magnetic writer showing exemplary gap configurations to provide partially magnetically decoupled shield portions.

FIGS. 8A-8C are medium confronting surface views of a portion of the magnetic writer showing other exemplary gap configurations.

DETAILED DESCRIPTION

Figure 1A:
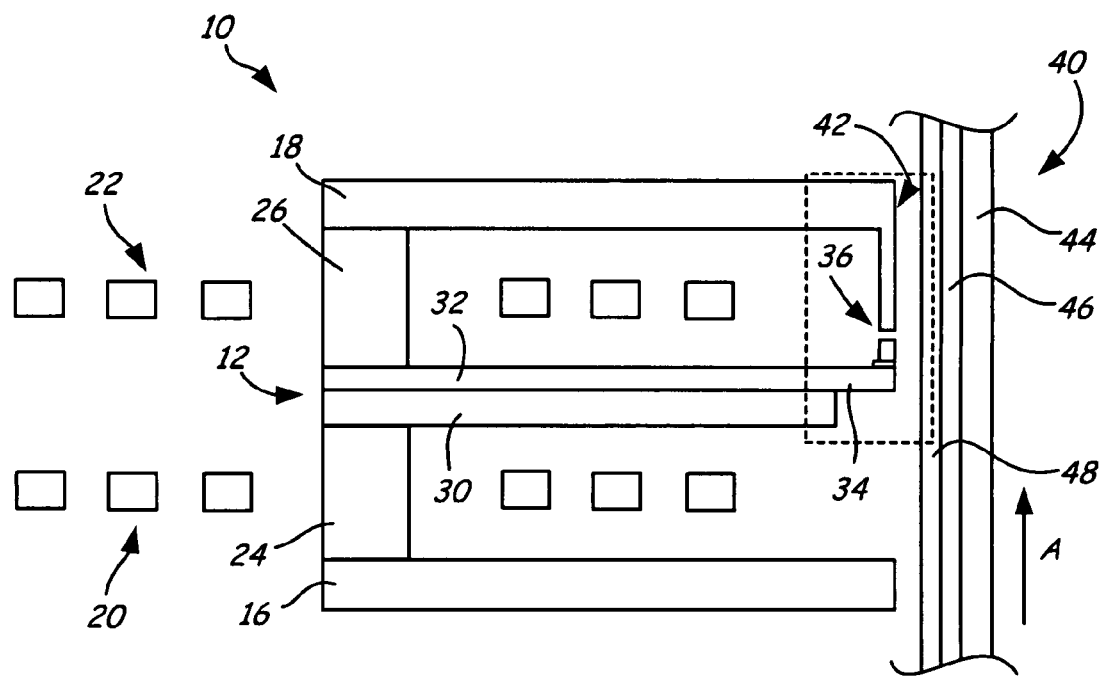
FIG. 1A is a cross-section view of a magnetic writer disposed relative to a magnetic medium.
Figure 1B:
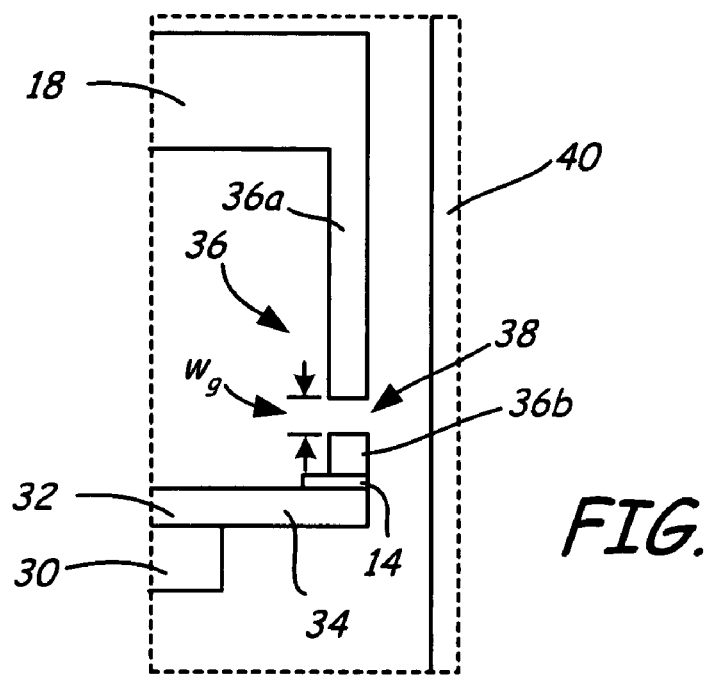
FIG. 1B is a detailed cross-section view of the magnetic writer showing a conductor for providing a write assist field adjacent a trailing shield including a gap.

FIG. 1A is a cross-section view and FIG. 1B is a detailed cross-section view of magnetic writer 10, which includes write pole or element 12, current carrying conductor 14, first return pole or element 16, second return pole or element 18, first conductive coil 20, and second conductive coil 22. First conductive coil 20 surrounds first magnetic stud 24 that magnetically couples write pole 12 to first return pole 16. Second conductive coil 22 surrounds second magnetic stud 26 that magnetically couples write pole 12 and second return pole 18. A portion of conductive coil 20 is disposed between write pole 12 and first return pole 14, and a portion of second conductive coil 22 is disposed between write pole 12 and second return pole 18. Write pole 12 includes yoke 30 and write pole body 32 having write pole tip 34. Shield 36 including gap 38 extends from second return pole 18 toward current carrying conductor 14 and write pole tip 34.

First return pole 16, second return pole 18, first magnetic stud 24, and second magnetic stud, 26 may comprise soft magnetic materials (e.g., NiFe). Conductive coils 20 and 22 may comprise a material with low electrical resistance, such as Cu. Write pole body 32 may comprise a high moment magnetic material, such as CoFe, and yoke 34 and shield 36 may comprise a soft magnetic material, such as NiFe, to improve the efficiency of flux delivery to write pole body 32.

Magnetic writer 10 confronts magnetic medium 40 at medium confronting surface 42 defined by of write pole tip 34, first return pole 16, and second return pole 18. Magnetic medium 40 includes substrate 44, soft underlayer (SUL) 46, and medium layer 48. SUL 46 is disposed between substrate 44 and medium layer 48. Magnetic medium 40 is positioned proximate to magnetic writer 10 such that the surface of medium layer 48 opposite SUL 46 faces write pole 12. Magnetic medium 40 is shown merely for purposes of illustration, and may be any type of medium usable in conjunction with magnetic writer 10, such as composite media, continuous/granular coupled (CGC) media, discrete track media, and bit-patterned media.

Magnetic writer 10 is carried over the surface of magnetic medium 40, which is moved relative to magnetic writer 10 as indicated by arrow A such that write pole 12 trails first return pole 16, leads second return pole 18, and is used to physically write data to magnetic medium 40. In order to write data to magnetic medium 40, a first current is caused to flow through first conductive coil 20. The magnetomotive force in the coils causes magnetic flux to travel from write pole tip 34 perpendicularly through medium layer 48, across SUL 46, and through first return pole 16 and first magnetic stud 24 to provide a first closed magnetic flux path. The direction of the write field at the medium confronting surface of write pole tip 34, which is related to the state of the data written to magnetic medium 40, is controllable based on the direction that the first current flows through first conductive coil 20.

Stray magnetic fields from outside sources, such as a voice coil motor associated with actuation of magnetic writer 10 relative to magnetic medium 40, may enter SUL 46. Due to the closed magnetic path between write pole 12 and first return pole 18, these stray fields may be drawn into magnetic writer 10 by first return pole 18. In order to reduce or eliminate these stray fields, second return pole 18 is connected to write pole 12 via second magnetic stud 26 to provide a flux path for the stray magnetic fields. In addition, the strength of the write field through write pole 12 may be increased by causing a second current to flow through second conductive coil 22. The magnetomotive force in the coils causes magnetic flux to travel from write pole tip 34 perpendicularly through medium layer 48, across SUL 46, and through second return pole 18 and second magnetic stud 26 to provide a second closed magnetic flux path. The direction of the second current is opposite that of the first current to generate magnetic flux in the same direction through write pole 12. The effect of employing two return poles and two conductive coils is an efficient driving force to write pole 12, with a reduction on the net driving force on first return pole 16 and second return pole 18.

Magnetic writer 10 is shown merely for purposes of illustrating an example construction that may be used in conjunction with the principles of the present invention, and variations on the design may be made. For example, while write pole 12 includes write pole body 32 and yoke 30, write pole 12 can also be comprised of a single layer of magnetic material. In addition, a single trailing return pole may be provided instead of the shown dual return pole writer configuration. Also, conductive coil 20 may have other configurations, such as a single turn coil or a coil disposed helically around write pole 12. Furthermore, magnetic writer 10 is configured for writing data perpendicularly to magnetic medium 40, but magnetic writer 10 and magnetic medium 40 may also be configured to write data longitudinally.

To write data to high coercivity medium layer 48, a stronger write field may be provided to impress magnetization reversal in the medium. To accomplish this, conductor 14 is provided proximate to write pole 12 and magnetic medium 40. When a current is applied to conductor 14, an assist magnetic field is generated that augments the write field produced by write pole 12. The combination of the write field and the assist field generated by conductor 14 overcomes the high coercivity of medium layer 48 to permit controlled writing of data to magnetic medium 40. In addition, conductor 14 improves the write field gradient, which provides for a stronger write field proximate to write pole tip 34.

Shield 36 is included in magnetic writer 10 to improve the down-track write field gradient of magnetic flux from write pole 12. Magnetic flux through write pole 12 that is induced by current through conductive coil 22 passes through shield 36 parallel to magnetic medium 40. This reduces the perpendicular field component in the region between shield 36 and magnetic medium 40, providing most of the perpendicular component from magnetic writer 10 proximate to write pole 12. As a result, information recorded in medium layer 48 is subject to less destabilization in the down-track direction from magnetic writer 10.

FIG. 1B is a detailed cross-section view of yoke 30, write pole body 32, write pole tip 34, conductor 14, shield 36, second return pole 18, and magnetic medium 40. It should be noted that the features of the components of magnetic writer 10 shown in FIG. 1B are not necessarily drawn to scale. Shield 36 provides a large feature close to write pole 12 to prevent damage to write pole 12 during contact between magnetic writer 10 and magnetic medium 40. Shield 36 may extend from second return pole 18 such that shield 36 is adjacent to conductor 14 and proximate write pole tip 34.

Write pole tip 34 is substantially aligned with shield 36 at medium confronting surface 42, and the surface area of shield 36 is substantially larger than that of write pole tip 34 at medium confronting surface 42. Consequently, damage to write pole 12 due to contact events between magnetic writer 10 and magnetic medium 40 is minimized since shield 36, which is less susceptible to long term effects from the contact events, protects write pole tip 34.

The magnetic fields generated by conductor 14 on the side opposite from write pole 12 have a direction opposite the write field. Due to the soft magnetic material of shield 36, these magnetic fields may become large enough to partially erase data stored in medium layer 48. To reduce the effect of these stray fields, shield 36 includes gap 38 having a width $w_g$ and comprised of a non-magnetic material. The non-magnetic material of gap 38 may be the same or similar material as the material that surrounds second conductive coil 22. In the embodiment shown, gap 38 magnetically decouples first portion 36a of shield 36 proximate to write pole tip 34 from second portion 36b of shield 36. Magnetically decoupled portion 36b is more susceptible to surrounding stray fields than a shield 36 without gap 38. Consequently, the local fields generated by conductor 14 at shield 36 are partially balanced by stray fields from the write pole (which have a direction opposite that of the local fields from conductor 14). Thus, the net field in the magnetically decoupled portion of shield 36 is reduced well below the threshold for media erasure. In an alternative embodiment, first portion 36a extends further from medium confronting surface 42 than second portion 36b (i.e., first portion 36a has a greater throat height than second portion 36b).

Figure 2:
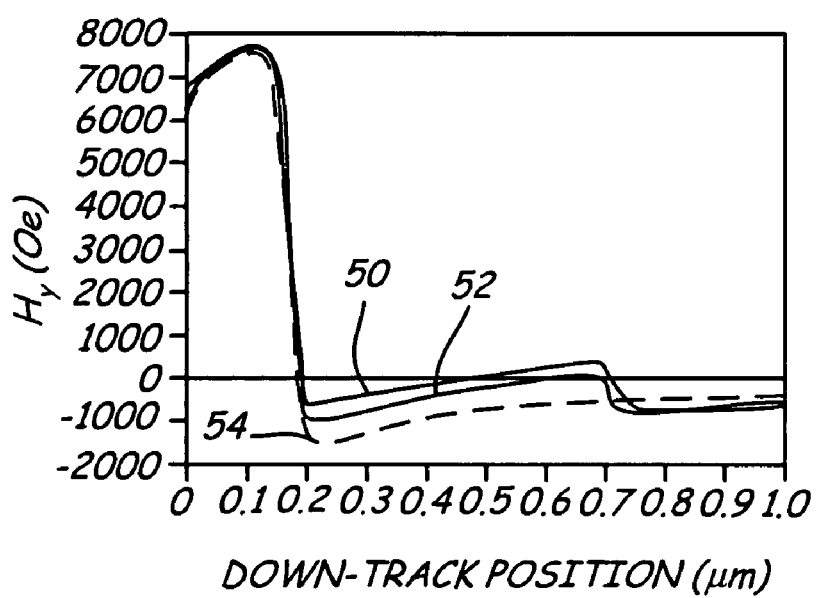
FIG. 2 is a graph showing the effect of shield gap width variations on the perpendicular component of the combined write field from the write pole and the assist field from the conductor as a function of the down-track position.

FIG. 2 is a graph showing the effect of gap width $w_g$ on the perpendicular component ($H_y$) of the combined write field from write pole 12 and assist field from conductor 14 as a function of the down-track position (i.e., from write pole tip 34 toward second return pole 18). The center of write pole tip 34 is plotted at down-track position 0.0 µm, with the trailing edge of write pole tip 34 at about 0.1 µm. Line 50 shows $H_y$ for gap width $w_g$ of 10 nm and line 52 shows $H_y$ for gap width $w_g$ of 50 nm. For comparison, line 54 shows $H_y$ for shield 36 with no gap. As is shown, including a gap with gap width $w_g$ slightly increases the peak perpendicular field generated by magnetic writer 10 and reduces the undershoot of $H_y$ proximate the trailing edge of write pole tip 34. Consequently, gap width $w_g$ can be set to minimize the field undershoot and maintain the perpendicular field for magnetic writer 10 below the media erasure level in the down-track direction.

The size and shape of gap 38 in shield 36 may be varied to provide variations in the perpendicular field response of shield 36, particularly in magnetically decoupled portion 36b. FIGS. 3A-3C are medium confronting surface views of conductor 14, write pole tip 34, shield 36, and return pole 18 showing exemplary configurations for gap 38 in shield 36. Shield includes major edge 60 adjacent to conductor 14 and minor edges 62 and 64 substantially perpendicular to major edge 60. The longer dimension of shield 36 bounded by minor edges 62 and 64 at medium confronting surface 42 is herein referred to as the major dimension, and the shorter dimension perpendicular to the major dimension at medium confronting surface 42 is herein referred to as the minor dimension. In FIG. 3A, gap 38 extends along a small portion of the major dimension and to major edge 60 of shield 36 to provide magnetically decoupled portion 36b having a small profile adjacent conductor 14. In FIG. 3B, gap 38 extends further along the major dimension and to major edge 60 of shield 36 to provide magnetically decoupled portion 36b having a larger profile adjacent conductor 14. In FIG. 3C, gap 38 extends across the entire major dimension of shield 36 to minor edges 62 and 64 to provide magnetically decoupled portion 36b having a major dimension equal to that of portion 36a.

Figure 4A:
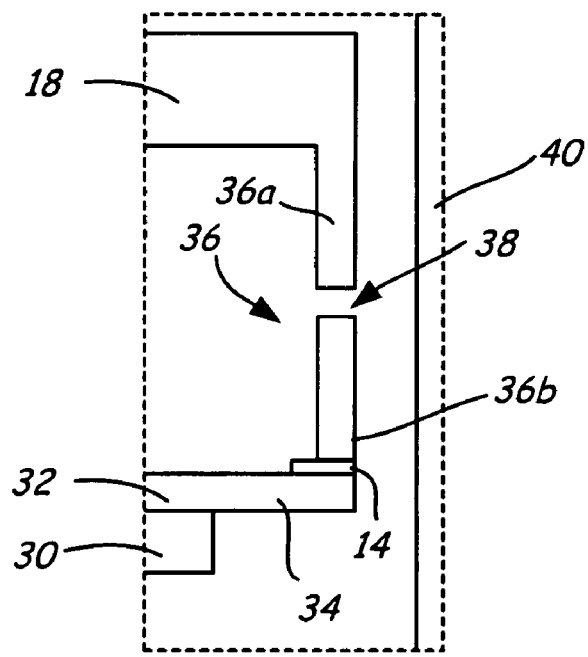
FIGS. 4A and 4B are detailed cross-section views of the magnetic writer showing exemplary locations of the gap in the trailing shield.
Figure 4B:
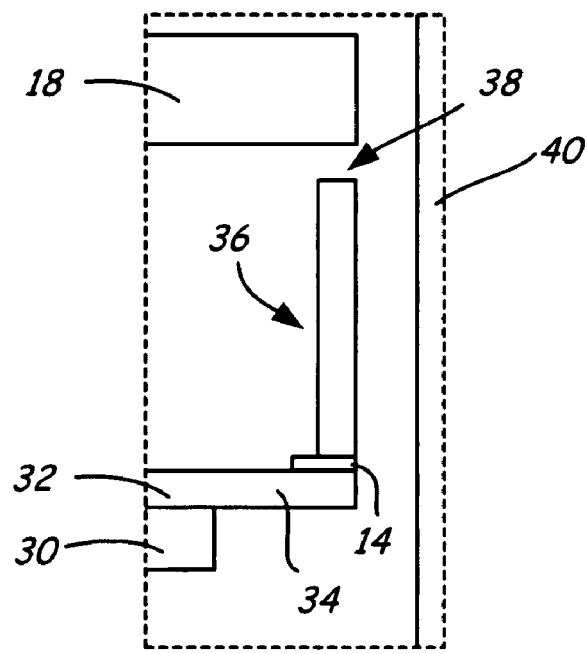

The location of gap 38 in shield 36 may also be varied to provide variations in the perpendicular field response of shield 36. FIGS. 4A and 4B are detailed cross-section views of yoke 30, write pole body 32, write pole tip 34, conductor 14, shield 36, second return pole 18, and magnetic medium 40 showing exemplary alternative locations of gap 38 in shield 36. In FIG. 4A, gap 38 is formed about halfway between conductor 14 and second return pole 18 to provide magnetically decoupled portion 38 having a larger minor dimension profile at medium confronting surface 42. In FIG. 4B, gap 38 is formed adjacent to second return pole 18 to provide shield 36 having an even larger minor dimension profile adjacent conductor 14. In essence, gap 38 may be formed anywhere between conductor 14 and second return pole 18. In addition, the size and shape of gap 38 in FIG. 4A and FIG. 4B may be the same or similar to any of those described with regard to FIGS. 3A-3C.

Figure 5A:
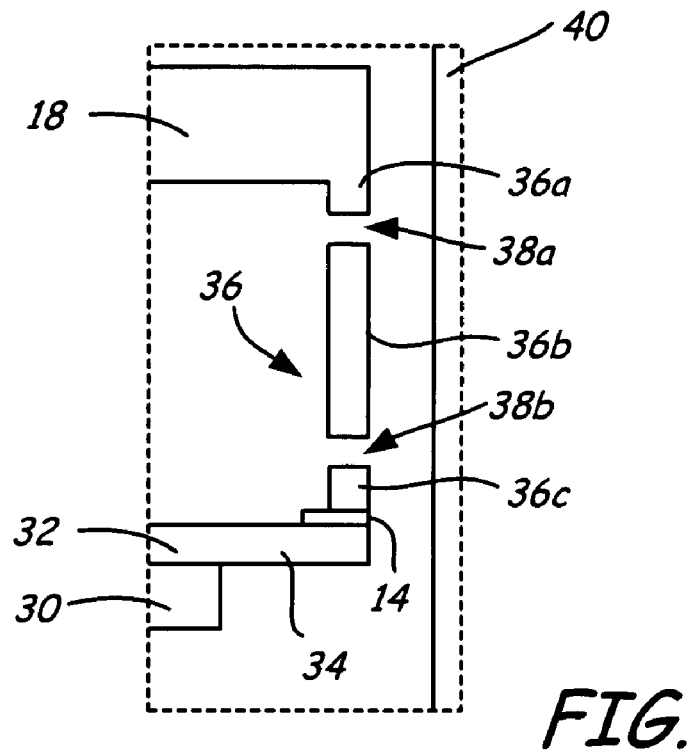
FIGS. 5A and 5B are detailed cross-section views of the magnetic writer showing a trailing shield including two gaps.
Figure 5B:
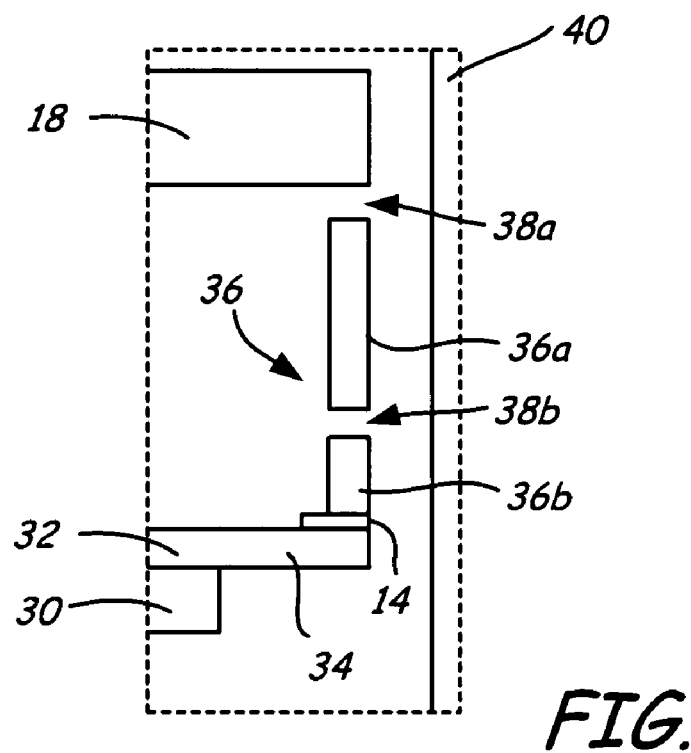

Additional gaps 38 may also be formed in shield 36 to vary the perpendicular field response of shield 36. FIGS. 5A and 5B are detailed cross-section views of yoke 30, write pole body 32, write pole tip 34, conductor 14, shield 36, second return pole 18, and magnetic medium 40 showing shield 36 including two gaps 38a and 38b. In FIG. 5A, gaps 38a and 38b are both formed intermediate conductor 14 and second return pole 18 to provide portion 38a adjacent second return pole 18 and two magnetically decoupled portions 36b and 36c. In FIG. 5B, gap 38a is formed adjacent second return pole 18 and gap 38b is formed intermediate conductor 14 and second return pole 18 to provide magnetically decoupled portions 36a and 36b. By magnetic decoupling two portions of shield 36, the perpendicular magnetic field along shield 36 may be tuned by adjusting the configuration and dimensions of gaps 38a and 38b. It should be noted that the location of gaps 38a and 38b in FIGS. 5A and 5B are merely illustrative, and variations on this design are contemplated. It should also be noted that while two gaps 38a and 38b are shown, additional gaps may also be formed to provide additional magnetically decoupled portions of shield 36.

FIGS. 6A-6C are medium confronting surface views of a portion of conductor 14, write pole tip 34, shield 36, and return pole 18 showing exemplary configurations for gaps 38a and 38b in shield 36. In FIG. 6A, gap 38a extends adjacent second return pole 18 across the entire major dimension to minor edges 62 and 64, and gap 38b extends along a portion of the major dimension and to major edge 60 of shield 36 to provide shield portions 36a and 36b. In FIG. 6B, gaps 38a and 38b both extend along a portion of the major dimension and to major edge 60 of shield 36 to provide shield portions 36a, 36b, and 36c. In FIG. 6C, gap 38a extends adjacent to second return pole across the entire major dimension to minor edges 62 and 64, and gap 38b extends across the entire major dimension to minor edges 62 and 64 intermediate conductor 14 and second return pole 18 to provide shield portions 36a and 36b.

The gap or gaps 38 formed in shield 36 may alternatively be formed such that they extend across the major dimension of shield 36 but do not extend to either major edge 60 or minor edges 62 or 64. FIGS. 7A-7C are medium confronting surface views of conductor 14, write pole tip 34, shield 36, and return pole 18 showing such gap configurations that provide partially magnetically decoupled portions in shield 36. In FIG. 7A, gap 38 extends along a small portion of the major dimension of shield 36 to provide partially magnetically decoupled portion 36b having a small profile adjacent conductor 14. In FIG. 7B, gap 38 extends further along the major dimension and to major edge 60 of shield 36 to provide partially magnetically decoupled portion 36b having a larger profile adjacent conductor 14. In FIG. 7C, gaps 38a and 38b extend along the major dimension of shield 36 to provide partially magnetically decoupled portions 36b and 36c.

FIGS. 8A, 8B, and 8C are medium confronting surface views of conductor 14, write pole tip 34, shield 36, and return pole 18 showing additional exemplary gapped shield configurations. In FIG. 8A, gap 38a extends along a portion of the major dimension and to major edge 60 of shield 36, and gap 38b extends along a portion of the major dimension of shield 36, but does not extend to major edge 60 or minor edges 62 or 64. This configuration provides shield portion 36a adjacent second return pole 18, magnetically decoupled portion 36b, and partially magnetically decoupled portion 36c. In FIG. 8B, gap 38a extends along a portion of the major dimension of shield 36, but does not extend to major edge 60 or minor edges 62 or 64, and gap 38b extends along a portion of the major dimension and to major edge 60 of shield 36. This configuration provides shield portion 36a adjacent second return pole 18, partially magnetically decoupled portion 36b, and magnetically coupled portion 36c adjacent to conductor 14. In FIG. 8C, gap 38 extends along a portion of the major dimension of shield 36 more proximate to second return pole 18 than the embodiment shown in FIG. 7B, but does not extend to major edge 60 or minor edges 62 or 64.

In summary, the present invention relates to a magnetic device including a write element having a write element tip and a first return element magnetically coupled to the write element on a trailing side of the write element. A conductor, which is positioned proximate to an edge of the write element tip, is configured to generate an assist field that augments a write field generated by the write element. A shield that includes at least one gap extends from the first return element toward the write element tip. A magnetic device having this configuration not only increases the write field strength, but also improves the field gradient in the region in which transitions are written to a magnetic medium. In addition, the shield provides a large feature close to the write element to prevent damage to the write element during contact between the magnetic device and the magnetic medium. Furthermore, the at least one gap in the shield reduces the magnetic fields generated in the shield by the assist field from the conductor.

Although the present invention has been described with reference to preferred embodiments, workers skilled in the art will recognize that changes may be made in form and detail without departing from the spirit and scope of the invention.

The invention claimed is:

1. A magnetic device comprising:
   a write element including a write element tip;
   a first return element magnetically coupled to the write element on a trailing side of the write element;
   a conductor located along a medium confronting surface of the magnetic device proximate to an edge of the write element tip, the conductor configured to generate an assist field that augments a write field generated by the write element; and
   a shield including at least one gap that separates a shield first portion connected to the conductor and a shield second portion, the shield extending from the first return element toward the conductor.

2. The magnetic device of claim 1, and further comprising:
   a second return element magnetically coupled to the write element on a leading side of the write element.

3. The magnetic device of claim 1, wherein the at least one gap comprises a non-magnetic material.

4. The magnetic device of claim 1, wherein the at least one gap comprises a first gap between a first end of the shield adjacent the first return element and a second end of the shield opposite the first end.

5. The magnetic device of claim 4, wherein the at least one gap further comprises a second gap between the first gap and the first return element.

6. The magnetic device of claim 5, wherein the second gap is adjacent the first return element.

7. The magnetic device of claim 1, wherein the conductor is disposed proximate to the trailing side of the write element tip.

8. The magnetic device of claim 7, wherein the conductor is adjacent to at least a portion of the shield.

9. The magnetic device of claim 1, wherein the at least one gap is closer to the conductor than the first return element.

10. A magnetic writer comprising:
   a write element that generates a write field at a front surface;
   a first return element magnetically coupled to the write element on a trailing side of the write element;
   a second return element magnetically coupled to the write element on a leading side of the write element;
   a conductor, located along the front surface proximate to an edge of the write element, for carrying current to generate an assist field that augments the write field; and
   a shield including at least one gap that separates a first shield portion connected to the conductor and a second shield portion, the shield extending from the first return element toward the conductor.

11. The magnetic writer of claim 10, wherein the shield has a major dimension and a minor dimension at the front surface, and wherein the at least one gap extends through the shield along at least a portion of the major dimension at the front surface.

12. The magnetic writer of claim 11, wherein the at least one gap extends through the shield along the entire major dimension at the front surface.

13. The magnetic writer of claim 11, wherein the at least one gap includes a portion parallel to the major dimension and at least one portion parallel to the minor dimension.

14. The magnetic writer of claim 11, wherein the at least one gap does not extend through the shield along the entire major dimension.

15. The magnetic writer of claim 10, wherein the at least one gap comprises a first gap between a first end of the shield adjacent the first return element and a second end of the shield opposite the first end.

16. The magnetic writer of claim 15, wherein the at least one gap further comprises a second gap between the first gap and the first return element.

17. The magnetic writer of claim 10, wherein the at least one gap comprises a non-magnetic material.

18. The magnetic writer of claim 10, wherein the conductor is disposed proximate to the trailing side of the write element.

19. The magnetic writer of claim 18, wherein the conductor is adjacent to at least a portion of the shield.

20. A magnetic device comprising:
   a write element including a write element tip;
   a first return element magnetically coupled to the write element on a trailing side of the write element;
   a conductor proximate to an edge of the write element tip, the conductor configured to generate an assist field that augments a write field generated by the write element; and
   a shield extending from the first return element toward the write element tip including a first gap between a first end of the shield adjacent the first return element and a second end of the shield opposite the first end and a second gap adjacent the first return element.

* * * * *